United States Patent
Kamiya et al.

(10) Patent No.: US 9,692,289 B2
(45) Date of Patent: Jun. 27, 2017

(54) DC POWER-SUPPLY DEVICE AND REFRIGERATION-CYCLE APPLICATION DEVICE INCLUDING THE SAME

(71) Applicant: Mitsubishi Electric Corporation, Tokyo (JP)

(72) Inventors: Shota Kamiya, Tokyo (JP); Kazunori Hatakeyama, Tokyo (JP); Norikazu Ito, Tokyo (JP); Kenta Yuasa, Tokyo (JP); Shoji Isoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/787,527

(22) PCT Filed: Jun. 25, 2013

(86) PCT No.: PCT/JP2013/067395
§ 371 (c)(1),
(2) Date: Oct. 28, 2015

(87) PCT Pub. No.: WO2014/207824
PCT Pub. Date: Dec. 31, 2014

(65) Prior Publication Data
US 2016/0079845 A1   Mar. 17, 2016

(51) Int. Cl.
*H02M 1/12* (2006.01)
*H02M 7/06* (2006.01)
(Continued)

(52) U.S. Cl.
CPC ........... *H02M 1/12* (2013.01); *H02M 1/4216* (2013.01); *H02M 3/158* (2013.01); *H02M 7/06* (2013.01);
(Continued)

(58) Field of Classification Search
CPC .............. H02M 1/12; H02M 7/06; H02P 6/00
(Continued)

(56) References Cited

U.S. PATENT DOCUMENTS 5,430,639 A   7/1995  Takahashi
6,137,700 A   10/2000 Iida et al.
(Continued)

FOREIGN PATENT DOCUMENTS

EP   2164161 A2    3/2010
JP   58-204770 A  11/1983
(Continued)

OTHER PUBLICATIONS

U.S. Appl. No. 14/909,498, filed Feb. 2, 2016, Hatakeyama et al.
(Continued)

*Primary Examiner* — Kawing Chan
(74) *Attorney, Agent, or Firm* — Posz Law Group, PLC

(57) ABSTRACT

A DC power-supply device that suppresses an increase of a harmonic current and deterioration of a power factor without causing any imbalance among respective phase currents, in a configuration in which a three-phase alternating current is converted into a direct current and supplied to a load. The DC power-supply device includes a rectifier circuit, a reactor connected to an input side or an output side of the rectifier circuit, a first capacitor and a second capacitor serially connected between output terminals to a load, and a charging unit. During a cycle combining a charging period and a non-charging period of a pair of the first capacitor and the second capacitor, the charging unit is controlled so that a charging frequency becomes 3n times (n is a natural number) the frequency of the three-phase alternating current.

20 Claims, 9 Drawing Sheets

(51) Int. Cl.
*H02P 6/00* (2016.01)
*H02M 3/158* (2006.01)
*H02M 7/217* (2006.01)
*H02M 1/42* (2007.01)

(52) U.S. Cl.
CPC ............ *H02M 7/217* (2013.01); *H02P 6/002* (2013.01); *Y02B 70/126* (2013.01)

(58) Field of Classification Search
USPC .................... 318/400.3, 400.01, 700; 363/44
See application file for complete search history.

(56) References Cited

U.S. PATENT DOCUMENTS

| | | |
|---|---|---|
| 6,181,583 B1 | 1/2001 | Okui et al. |
| RE39,060 E | 4/2006 | Okui et al. |
| 7,274,579 B2 | 9/2007 | Ueda et al. |
| 7,403,400 B2 | 7/2008 | Stanley |
| 7,576,299 B2 | 8/2009 | Rossetto et al. |
| 8,269,141 B2 | 9/2012 | Daniel et al. |
| 8,278,896 B2 | 10/2012 | Horii |
| 8,498,136 B2 | 7/2013 | Shinomoto et al. |
| 8,581,147 B2 | 11/2013 | Kooken et al. |
| 8,823,303 B2 | 9/2014 | Shinomoto et al. |
| 2006/0175313 A1 | 8/2006 | Kooken et al. |
| 2011/0019452 A1 | 1/2011 | Shinomoto et al. |

FOREIGN PATENT DOCUMENTS

| | | |
|---|---|---|
| JP | 58-207870 A | 12/1983 |
| JP | 03-003189 U | 1/1991 |
| JP | 03-101187 U | 10/1991 |
| JP | H05-328729 | 12/1993 |
| JP | 06-253540 A | 9/1994 |
| JP | 08-186981 A | 7/1996 |
| JP | 08-237957 A | 9/1996 |
| JP | 2539158 Y2 | 4/1997 |
| JP | 10-174442 A | 6/1998 |
| JP | 2000-146392 A | 5/2000 |
| JP | 2000-278955 A | 10/2000 |
| JP | 2000-324843 A | 11/2000 |
| JP | 2001-050625 A | 2/2001 |
| JP | 2001-145360 | 5/2001 |
| JP | 2001-286130 A | 10/2001 |
| JP | 2002-176778 A | 6/2002 |
| JP | 2004-023948 | 1/2004 |
| JP | 2004-180422 A | 6/2004 |
| JP | 2005-045995 A | 2/2005 |
| JP | 2005-110491 A | 4/2005 |
| JP | 2005-323440 A | 11/2005 |
| JP | 2006-026736 A | 2/2006 |
| JP | 2006-223092 A | 8/2006 |
| JP | 2006-271185 A | 10/2006 |
| JP | 2006-325306 A | 11/2006 |
| JP | 2007-166783 A | 6/2007 |
| JP | 2008-012586 A | 1/2008 |
| JP | 2008-295228 A | 12/2008 |
| JP | 2009-050109 A | 3/2009 |
| JP | 2009-273230 A | 11/2009 |
| JP | 4460572 B2 | 2/2010 |
| JP | 2010-068642 A | 3/2010 |
| JP | 2010-263739 A | 11/2010 |
| JP | 2011-036020 A | 2/2011 |
| JP | 2011-061887 A | 3/2011 |
| JP | 2011-244635 A | 12/2011 |
| JP | 2012-060801 A | 3/2012 |
| JP | 2012-165539 A | 8/2012 |
| JP | 2012-191761 | 10/2012 |
| JP | 2012-231646 A | 11/2012 |
| JP | 5087346 B1 | 12/2012 |
| JP | 2013-038921 A | 2/2013 |
| JP | 2013-110839 A | 6/2013 |
| JP | 5274579 B2 | 8/2013 |
| WO | 2004/071703 A1 | 8/2004 |
| WO | 2009/028053 | 3/2009 |
| WO | 2013/057857 | 4/2013 |

OTHER PUBLICATIONS

U.S. Appl. No. 15/029,648, filed Apr. 15, 2016, Shinomoto et al.
U.S. Appl. No. 15/030,389, filed Apr. 19, 2016, Shinomoto et al.
International Search Report mailed Dec. 10, 2013 in a related PCT application No. PCT/JP2013/078298 (with English translation).
International Search Report mailed Oct. 29, 2013 in a related PCT application No. PCT/JP2013/074091 (with English translation).
International Search Report mailed Dec. 3, 2013 in a related PCT application No. PCT/JP2013/079288 (with English translation).
International Search Report of the International Searching Authority mailed Aug. 6, 2013 for the corresponding international application No. PCT/JP2013/067395 (and English translation).
Office Action mailed Dec. 13, 2016 issued in corresponding JP patent application No. 2015-544677 (and English translation).
Canadian Office Action of Jan. 31, 2017 in the corresponding CA application No. 2,927,417.
U.S. Patent Office issued Office Action mail date of Feb. 3, 2017 in the related U.S. Appl. No. 15/030,389.
Office Action dated Jan. 31, 2017 issued in corresponding CA patent application No. 2,927,417.
Canadian Office Action dated Mar. 1, 2017 issued in corresponding CA patent application No. 2,929,041.

ical Patent Application No. PCT/JP2013/067395 filed on Jun. 25, 2013, the disclosure of which is incorporated herein by reference.
DC POWER-SUPPLY DEVICE AND REFRIGERATION-CYCLE APPLICATION DEVICE INCLUDING THE SAME

CROSS REFERENCE TO RELATED APPLICATION

This application is a U.S. national stage application of International Patent Application No. PCT/JP2013/067395 filed on Jun. 25, 2013, the disclosure of which is incorporated herein by reference.

TECHNICAL FIELD

The present invention relates to a DC power-supply device and a refrigeration-cycle application device including the same.

BACKGROUND

Conventionally, in a DC power-supply device that uses, as a load, an inverter that drives a compressor motor or the like used in an air conditioner, a heat-pump water heater, a refrigerator, a freezer, and the like, as a configuration that converts an alternating current into a direct current, for example, a configuration that converts a single-phase alternating current into a direct current (for example, Patent Literature 1) and a configuration that converts a three-phase alternating current into a direct current have been disclosed (for example, Patent Literature 2). In these conventional techniques, switching loss can be decreased by keeping the switching frequency low, thereby enabling to achieve high efficiency.

PATENT LITERATURES

Patent Literature 1: Japanese Patent Application Laid-open No. 2000-278955
Patent Literature 2: Japanese Patent No. 5087346

In the configuration described in Patent Literature 1, in which a single-phase alternating current is converted into a direct current and supplied to a load, a power factor is improved by executing on/off control of two switching elements, in synchronization with a half cycle of a power supply frequency of a commercial alternating current. However, in the configuration described in Patent Literature 2, in which a three-phase alternating current is converted into a direct current and supplied to a load, if on/off control of two switching elements is executed in synchronization with a half cycle of a power supply frequency, imbalance occurs between respective phase currents, thereby causing an increase of a harmonic current and deterioration of the power factor.

SUMMARY

The present invention has been achieved in view of the above problems, and an object of the present invention is to provide a DC power-supply device that can suppress an increase of a harmonic current and deterioration of a power factor without causing any imbalance among respective phase currents, in a configuration in which a three-phase alternating current is converted into a direct current and supplied to a load, and to provide a refrigeration-cycle application device including the DC power-supply device.

To solve the above problems and achieve the object, a DC power-supply device according to the present invention converts a three-phase alternating current into a direct current and supplies the direct current to a load, the DC power-supply device includes: a rectifier circuit that rectifies the three-phase alternating current; a reactor connected to an input side or an output side of the rectifier circuit; a first capacitor and a second capacitor serially connected between output terminals to the load; a charging unit that selectively charges one or both of the first capacitor and the second capacitor; and a control unit that controls the charging unit. The control unit controls the charging unit in such a manner that, when a period combining a charging period and a non-charging period of a pair of the first capacitor and the second capacitor is designated as one cycle, a charging frequency becomes an inverse number of the one cycle becomes 3n times (n is a natural number) a frequency of the three-phase alternating current.

According to the present invention, in a configuration in which a three-phase alternating current is converted into a direct current and supplied to a load, a DC power-supply device that can suppress an increase of a harmonic current and deterioration of a power factor without causing any imbalance among respective phase currents and a refrigeration-cycle application device including the DC power-supply device can be obtained.

DESCRIPTION OF EMBODIMENTS

Exemplary embodiments of a DC power-supply device and a refrigeration-cycle application device including the DC power-supply device according to the present invention will be explained below in detail with reference to the accompanying drawings. The present invention is not limited to the embodiments.

First Embodiment

Figure 1:
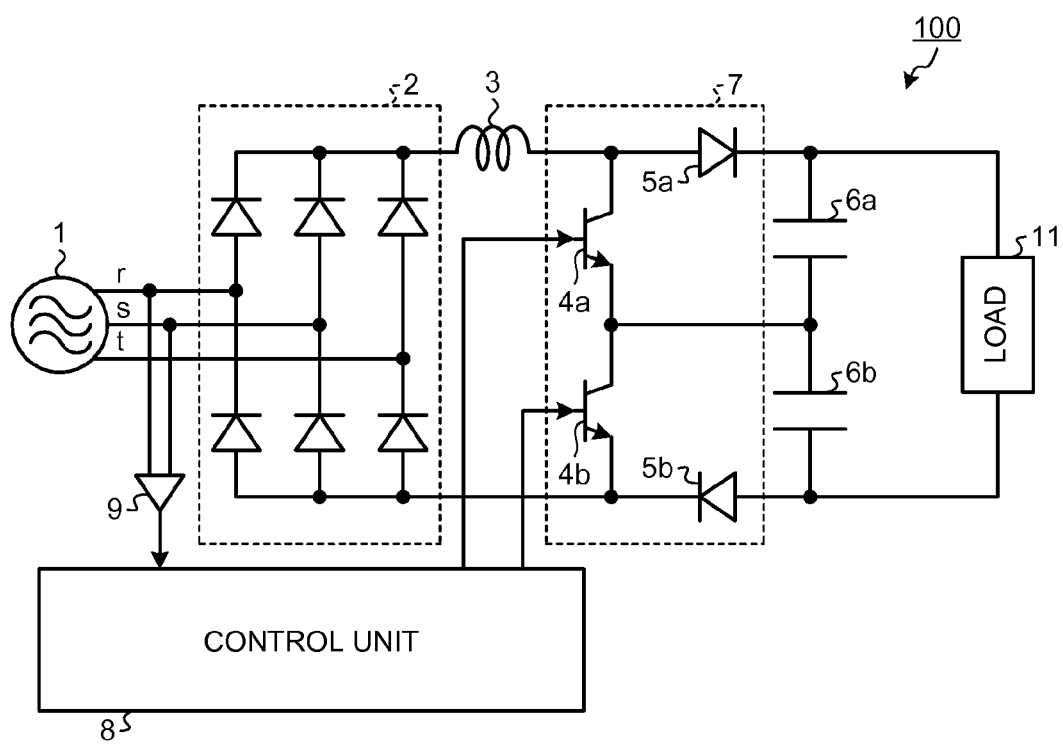
FIG. 1 is a diagram illustrating a configuration example of a DC power-supply device according to a first embodiment.

FIG. 1 is a diagram illustrating a configuration example of a DC power-supply device according to a first embodiment. As illustrated in FIG. 1, a DC power-supply device 100 according to the first embodiment has a configuration in which a three-phase alternating current supplied from an AC power supply 1 is converted into a direct current and supplied to a load 11. In the present embodiment, it is assumed that the load 11 is an inverter load or the like that drives a compressor motor used in, for example, a refrigeration-cycle application device.

The DC power-supply device 100 includes a rectifier circuit 2 that rectifies a three-phase alternating current, a reactor 3 connected to an output side of the rectifier circuit 2, a first capacitor 6a and a second capacitor 6b serially connected between output terminals to the load 11, a charging unit 7 that selectively charges one or both of the first capacitor 6a and the second capacitor 6b, a control unit 8 that controls the charging unit 7, and a power-supply voltage-detection unit 9 that detects a voltage of the three-phase alternating current. In the example illustrated in FIG. 1, while an example in which the reactor 3 is connected to an output side of the rectifier circuit 2 is illustrated, the reactor 3 may be configured to be connected to an input side of the rectifier circuit 2.

The rectifier circuit 2 is a three-phase full-wave rectifier circuit in which six rectifier diodes are full-bridge connected. In the example illustrated in FIG. 1, the power-supply voltage-detection unit 9 detects line voltages of two phases (here, an r-phase and an s-phase) of the three-phase alternating current supplied from the AC power supply 1.

The charging unit 7 includes a first switching element 4a that switches charging and non-charging of the first capacitor 6a, a second switching element 4b that switches charging and non-charging of the second capacitor 6b, a first backflow prevention element 5a that prevents backflow of a charged electric charge of the first capacitor 6a to the first switching element 4a, and a second backflow prevention element 5b that prevents backflow of the charged electric charge of the second capacitor 6b to the second switching element 4b.

A midpoint of a series circuit including the first switching element 4a and the second switching element 4b and a midpoint of a series circuit including the first capacitor 6a and the second capacitor 6b are connected to each other. The first backflow prevention element 5a is connected in a forward direction from a collector of the first switching element 4a toward a connection point between the first capacitor 6a and the load 11, and the second backflow prevention element 5b is connected in a forward direction from a connection point between the second capacitor 6b and the load 11 toward an emitter of the second switching element 4b.

Capacitors having the same capacity are used for the first capacitor 6a and the second capacitor 6b. As the first switching element 4a and the second switching element 4b, for example, a semiconductor element such as a power transistor, a power MOSFET, or an IGBT is used.

The control unit 8 controls a direct current voltage to be supplied to the load 11 by executing on/off control of the first switching element 4a and the second switching element 4b. The switching control of the first switching element 4a and the second switching element 4b by the control unit 8 is described with reference to FIGS. 1 to 3.

Figure 2:
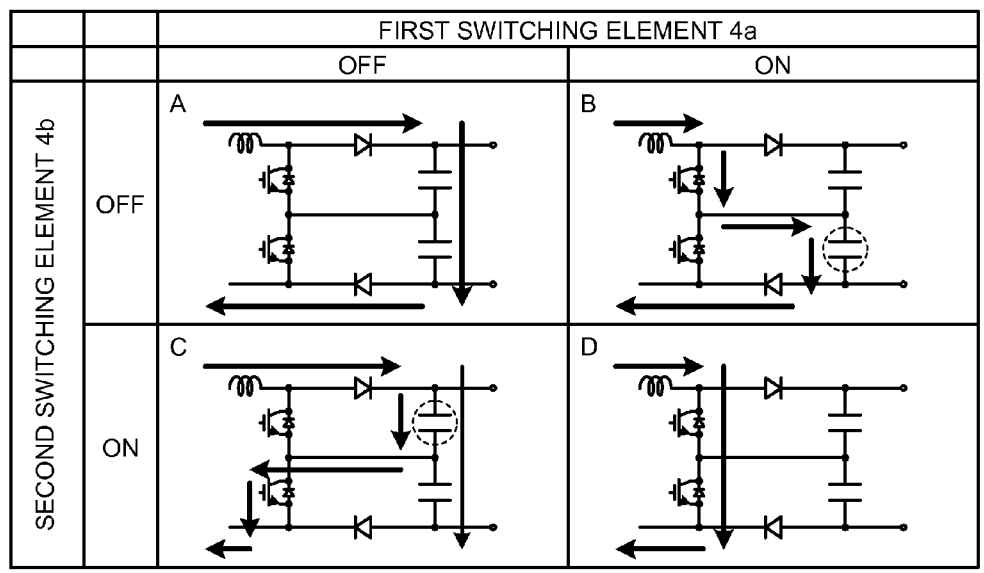
FIG. 2 is a diagram illustrating a switching control state in the DC power-supply device according to the first embodiment.

FIG. 2 is a diagram illustrating a switching control state in the DC power-supply device according to the first embodiment. In the example illustrated in FIG. 2, reference signs of respective constituent elements are omitted.

A state A indicates a state where both the first switching element 4a and the second switching element 4b are controlled to be off. In this state, charging of both the first capacitor 6a and the second capacitor 6b is performed.

A state B indicates a state where only the first switching element 4a is controlled to be on. In this state, only the second capacitor 6b is charged.

A state C indicates a state where only the second switching element 4b is controlled to be on. In this state, only the first capacitor 6a is charged.

A state D indicates a short-circuit state where both the first switching element 4a and the second switching element 4b are controlled to be on. In this state, charging of both the first capacitor 6a and the second capacitor 6b is not performed.

According to the first embodiment, by appropriately switching the respective states illustrated in FIG. 2, the direct current voltage to be supplied to the load 11 is controlled.

Figure 3:
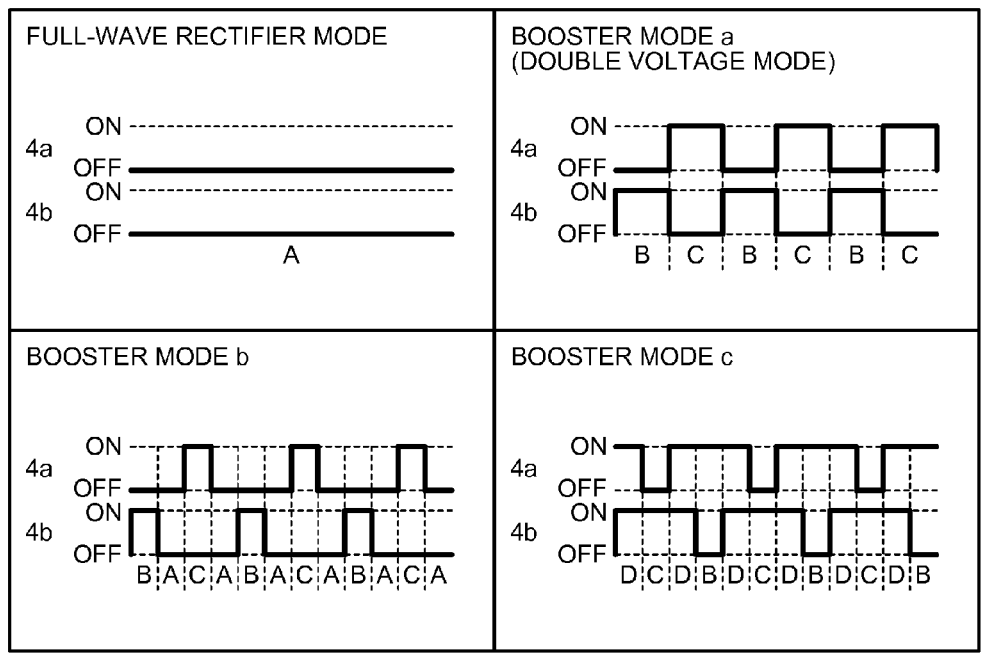
FIG. 3 is a diagram illustrating respective operating modes in the DC power-supply device according to the first embodiment.

FIG. 3 is a diagram illustrating respective operating modes in the DC power-supply device according to the first embodiment. As illustrated in FIG. 3, as the operating modes of the DC power-supply device 100 according to the first embodiment, there are a full-wave rectifier mode in which the first switching element 4a and the second switching element 4b are always in an off-controlled state, and a booster mode in which the first switching element 4a and the second switching element 4b are alternately controlled to be on.

The booster mode includes a booster mode a (a double voltage mode) in which an on-duty ratio of the first switching element 4a and the second switching element 4b is 50%, a booster mode b in which the on-duty ratio of the first switching element 4a and the second switching element 4b is less than 50%, and a booster mode c in which the on-duty ratio of the first switching element 4a and the second switching element 4b is larger than 50%.

In the full-wave rectifier mode, by controlling the first switching element 4a and the second switching element 4b to be in the off-controlled state all the time, a voltage full-wave rectified by the rectifier circuit 2 becomes an output voltage.

In the booster mode a (the double voltage mode), the on-timing of the first switching element 4a and the off-timing of the second switching element 4b are substantially simultaneous, and the off-timing of the first switching element 4a and the on-timing of the second switching element 4b are substantially simultaneous, thereby repeating the state B and the state C illustrated in FIG. 2. The output voltage at this time is almost twice as large as the output voltage in the full-wave rectifier mode.

In the booster mode b, a simultaneous off-period is provided, in which both the first switching element 4a and the second switching element 4b are controlled to be off. At this time, state transition of the state B→A→C→A illustrated in FIG. 2 is periodically repeated. The output voltage at this time becomes an intermediate voltage between the output voltage in the full-wave rectifier mode and the output voltage in the booster mode a (the double voltage mode).

In the booster mode c, a simultaneous on-period is provided, in which both the first switching element 4a and the second switching element 4b are controlled to be on. At this time, state transition of the state D→C→D→B illustrated in FIG. 2 is periodically repeated. In the simultaneous on-period (here, a period in the state D), energy is accumulated in the reactor 3. The output voltage at this time becomes a voltage equal to or larger than the output voltage in the booster mode a (the double voltage mode).

In this manner, in the present embodiment, by changing the on-duty ratio of the first switching element 4a and the second switching element 4b, the direct current voltage to be supplied to the load 11 can be controlled.

A charging frequency of the first capacitor 6a and the second capacitor 6b in the booster mode of the DC power-supply device 100 according to the first embodiment is described next with reference to FIG. 1 and FIGS. 4 to 6. It is assumed here that the charging frequency of the first capacitor 6a and the second capacitor 6b indicates a switching frequency being an inverse number of one cycle, when a period combining a charging period and a non-charging period of a pair of the first capacitor 6a and the second capacitor 6b, that is, a period combining an on-period and an off-period of a pair of the first switching element 4a and the second switching element 4b is designated as one cycle. In the following descriptions, the "charging frequency" is used for the descriptions in the expression of mainly the first capacitor 6a and the second capacitor 6b, and the "switching frequency" is used for the descriptions in the expression of mainly the first switching element 4a and the second switching element 4b.

Figure 4:
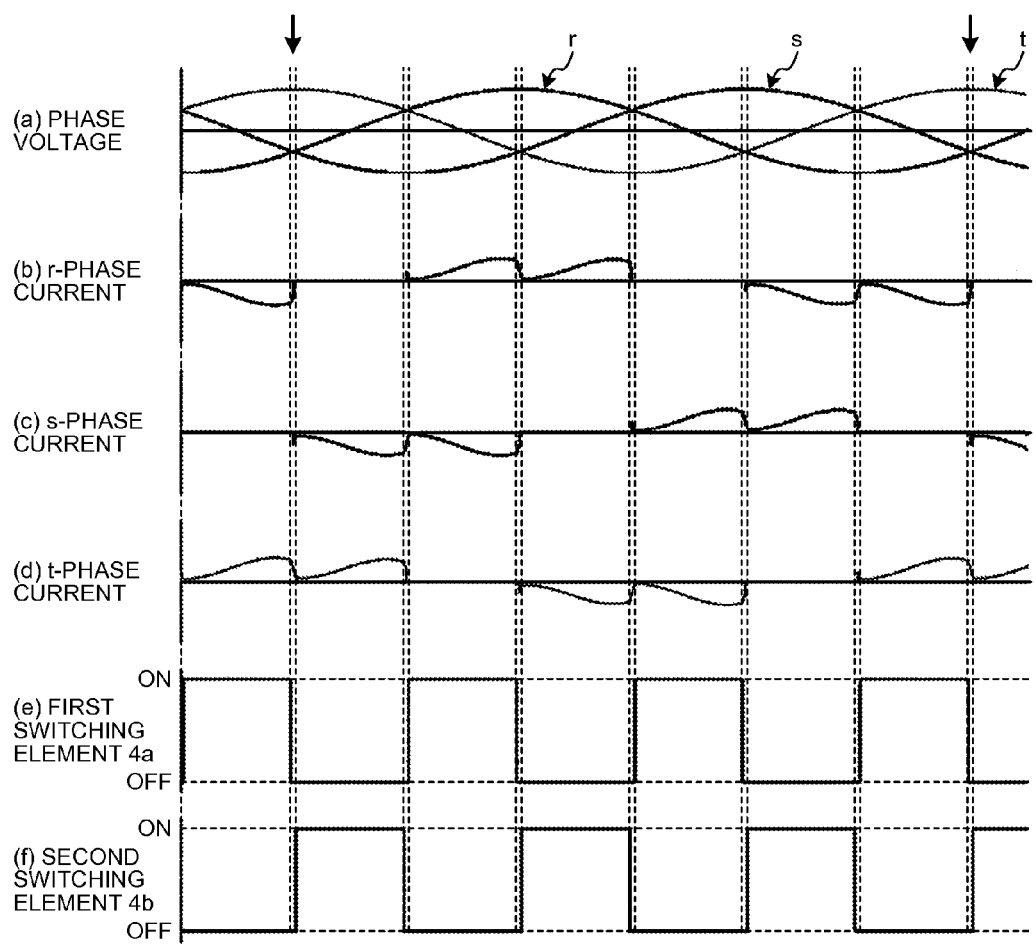
FIGS. 4(a) to 4(f) are diagrams illustrating examples of a switching pattern of the DC power-supply device according to the first embodiment, and of simulation waveforms of respective phase voltages and respective phase currents of a three-phase alternating current.

FIG. 4 are diagrams illustrating examples of a switching pattern of the DC power-supply device according to the first embodiment, and of simulation waveforms of respective phase voltages and respective phase currents of a three-phase alternating current. FIG. 4(a) illustrates simulation waveforms of respective phase voltages of the three-phase alternating current. FIG. 4(b) illustrates a simulation waveform of an r-phase current waveform of the three-phase alternating current. FIG. 4(c) illustrates a simulation waveform of an s-phase current waveform of the three-phase alternating current. FIG. 4(d) illustrates a simulation waveform of a t-phase current waveform of the three-phase alternating current. Further, FIG. 4(e) illustrates a switching pattern of the first switching element 4a, and FIG. 4(f) illustrates a switching pattern of the second switching element 4b.

In the present embodiment, control is executed so that the charging frequencies of the first capacitor 6a and the second capacitor 6b become 3n times the frequency of the three-phase alternating current (n is a natural number). In the example illustrated in FIG. 4, n=1, that is, the first switching element 4a and the second switching element 4b are alternately controlled to be on at a frequency three times the frequency of the three-phase alternating current. By executing control in this manner, as illustrated in FIG. 4, the waveforms of the respective phase currents become similar to each other.

Figure 5:
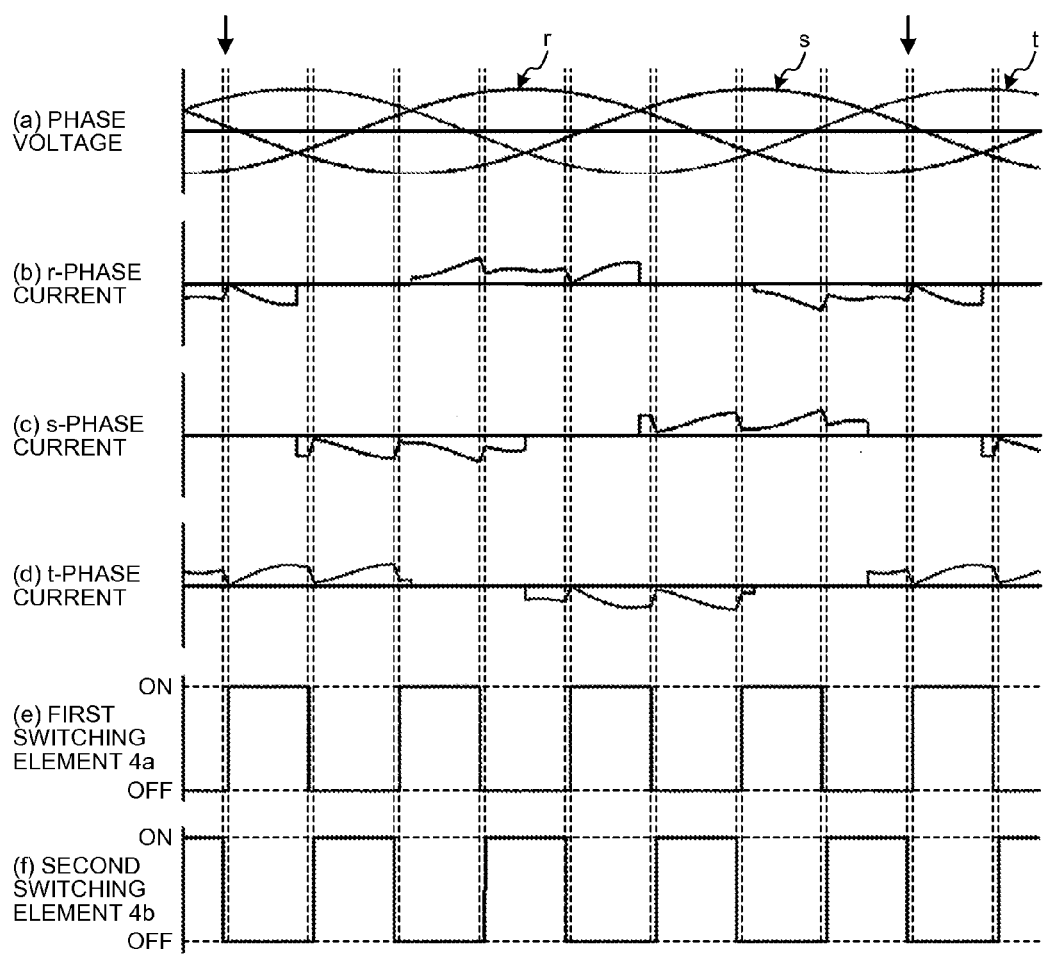
FIGS. 5(a) to 5(f) are diagrams illustrating examples of a switching pattern, when switching control is executed at a frequency four times a frequency of a three-phase alternating current, as a comparative example of the DC power-supply device according to the first embodiment, and of simulation waveforms of respective phase voltages and respective phase currents of a three-phase alternating current.

FIG. 5 are diagrams illustrating examples of a switching pattern, when switching control is executed at a frequency four times a frequency of a three-phase alternating current, as a comparative example of the DC power-supply device according to the first embodiment, and of simulation waveforms of respective phase voltages and respective phase currents of the three-phase alternating current. FIG. 5(a) illustrates simulation waveforms of respective phase voltages of the three-phase alternating current. FIG. 5(b) illustrates a simulation waveform of the r-phase current waveform of the three-phase alternating current. FIG. 5(c) illustrates a simulation waveform of the s-phase current waveform of the three-phase alternating current. FIG. 5(d) illustrates a simulation waveform of the t-phase current waveform of the three-phase alternating current. Further, FIG. 5(e) illustrates the switching pattern of the first switching element 4a, and FIG. 5(f) illustrates the switching pattern of the second switching element 4b.

As illustrated in FIG. 5, when the first switching element 4a and the second switching element 4b are switching-controlled at a frequency four times the frequency of the three-phase alternating current, the waveforms of the respective phase currents do not become similar to each other, and the respective phase currents are unbalanced. In the example illustrated in FIG. 5, while an example in which switching control is executed at a frequency four times the frequency of the three-phase alternating current is illustrated, also in a case where the switching control is executed in synchronization with the frequency of the three-phase alternating current, the respective phase currents are unbalanced in a similar manner.

In the configuration illustrated in FIG. 1, when a single-phase alternating current is input and the rectifier circuit 2 is a single-phase full-wave rectifier circuit in which four rectifier diodes are full-bridge connected, switching control is generally executed in synchronization with the power supply frequency, in order to achieve both reduction of the switching loss and improvement of the power factor.

On the other hand, in the DC power-supply device 100 according to the present embodiment, because a three-phase alternating current is input, phase shifting of respective phases of the three-phase alternating current by 120 degrees occurs with respect to the power supply cycle. Therefore, if switching control is executed in synchronization with the power supply frequency, switching of the first switching element 4a and the second switching element 4b is performed in a phase different for each phase.

In the booster mode a (the double voltage mode) in which the on/off-timings of the first switching element 4a and the second switching element 4b illustrated in FIG. 3 substantially match each other, if the simultaneous on-period and the simultaneous off-period of the first switching element 4a and the second switching element 4b are not generated, the imbalance among the respective phase currents does not occur, even if the switching frequency is not synchronized with the power supply frequency. However, in the booster mode b in which there is the simultaneous off-period of the first switching element 4a and the second switching element 4b, or in the booster mode c in which there is the simultaneous on-period of the first switching element 4a and the second switching element 4b, there is a difference in a current amount between the on-period of either the first switching element 4a or the second switching element 4b and the simultaneous on-period or the simultaneous off-period.

Figure 6:
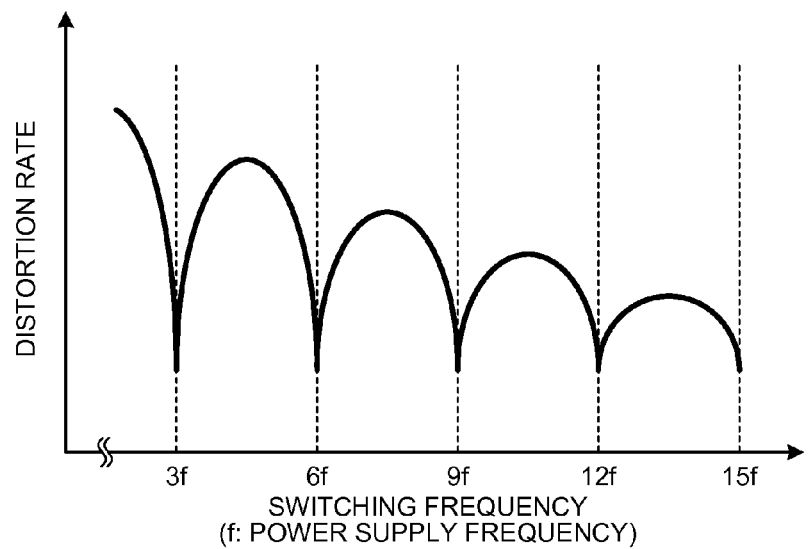
FIG. 6 is a diagram illustrating a relation between a switching frequency and a distortion rate of respective phase currents of a three-phase alternating current with respect to a basic waveform (a sinusoidal waveform).

FIG. 6 is a diagram illustrating a relation between a switching frequency and a distortion rate of respective phase currents of a three-phase alternating current with respect to a basic waveform (a sinusoidal waveform). As illustrated in FIG. 6, the distortion rate of the respective phase currents takes the minimum value at a frequency in which a switching frequency becomes 3n times the power supply frequency of the three-phase alternating current.

That is, if switching of the first switching element 4a and the second switching element 4b is not performed at a frequency 3n times the power supply frequency of the three-phase alternating current, but is performed with a phase different for each phase, imbalance among the respective phase currents occurs as illustrated in FIG. 5. As a result, the distortion rate of the respective phase currents increases as illustrated in FIG. 6, thereby causing deterioration of the power factor and an increase of the harmonic current.

According to the first embodiment, as described above, by executing the control in such a manner that the switching frequency of the first switching element 4a and the second switching element 4b, that is, the charging frequency of the first capacitor 6a and the second capacitor 6b becomes 3n times the frequency of the three-phase alternating current, switching of the first switching element 4a and the second switching element 4b is performed in the same phase of respective phases of the three-phase alternating current, while being shifted by 120 degrees with respect to the power supply cycle. Therefore, even in the booster mode b in which there is the simultaneous off-period of the first switching element 4a and the second switching element 4b, or in the booster mode c in which there is the simultaneous on-period of the first switching element 4a and the second switching element 4b, the waveforms of the respective phase currents of the three-phase alternating current become similar to each other as illustrated in FIG. 4. Accordingly, imbalance among the respective phase currents does not occur, and thus the distortion rate of the respective phase currents takes the minimum value as illustrated in FIG. 6, thereby enabling to improve the power factor and suppress the harmonic current.

An operation of the DC power-supply device 100 according to the first embodiment is described next with reference to FIGS. 1 to 6.

As illustrated in FIG. 1, the first embodiment has a configuration in which the power-supply voltage-detection unit 9 that detects the voltage of the three-phase alternating current is provided. In the example illustrated in FIG. 1, the configuration is such that the line voltage between the r-phase and the s-phase of the three-phase alternating current is detected. However, the configuration may be such that the line voltage between the s-phase and the t-phase or between the t-phase and the r-phase is detected, or the respective phase voltages are detected. The present invention is not limited to the configuration of the power-supply voltage-detection unit 9.

The control unit 8 changes the on-duty ratio of the first switching element 4a and the second switching element 4b in the booster mode, according to a detected voltage value of the three-phase alternating current acquired from a detection result of the power-supply voltage-detection unit 9.

Figure 7:
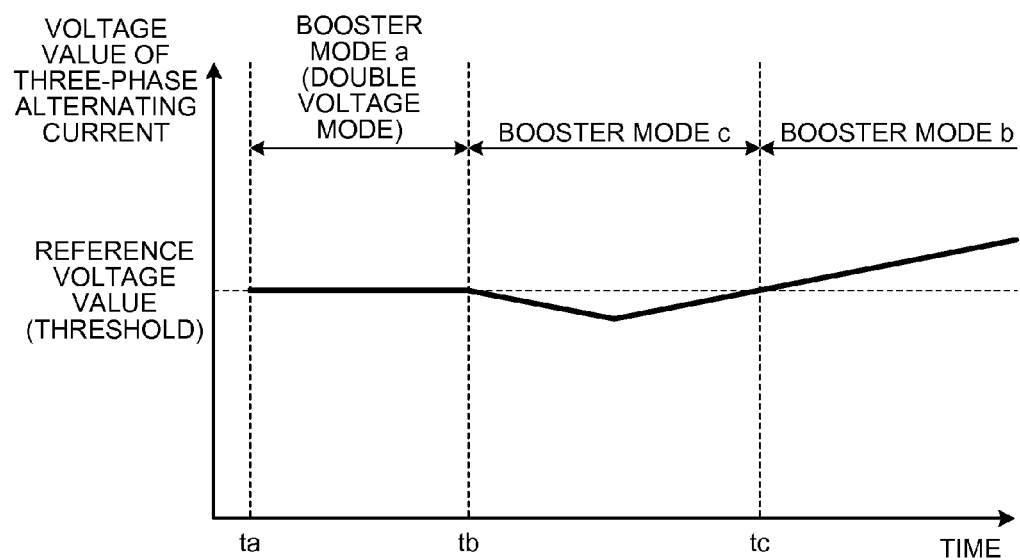
FIG. 7 is a diagram illustrating an operation example of the DC power-supply device according to the first embodiment.

FIG. 7 is a diagram illustrating an operation example of the DC power-supply device according to the first embodiment. In FIG. 7, a horizontal axis indicates a time and a vertical axis indicates a voltage value of a three-phase alternating current.

The control unit 8 holds a reference voltage value of the three-phase alternating current as a threshold, and executes control such that the DC power-supply device operates, for example, in the booster mode a (the double voltage mode) in which the on-duty ratio of the first switching element 4a and the second switching element 4b is 50% illustrated in FIG. 3, at the reference voltage value (a period from ta to tb illustrated in FIG. 7). If the detected voltage value is smaller than the reference voltage value (a period from tb to tc illustrated in FIG. 7), the control unit 8 causes the DC power-supply device to operate in the booster mode c in which the on-duty ratio of the first switching element 4a and the second switching element 4b is larger than 50%. If the detected voltage value is larger than the reference voltage value (a period tc and thereafter illustrated in FIG. 7), the control unit 8 causes the DC power-supply device to operate in the booster mode b in which the on-duty ratio of the first switching element 4a and the second switching element 4b is less than 50%.

Alternatively, for example, the control unit 8 may hold the on-duty ratio of the first switching element 4a and the second switching element 4b, with which the output voltage becomes constant with respect to the detected voltage value of the three-phase alternating current, as a table and apply the on-duty ratio of the first switching element 4a and the second switching element 4b according to the detected voltage value of the three-phase alternating current.

By executing such control, a voltage fluctuation portion of the three-phase alternating current can be absorbed, thereby enabling to stabilize the output voltage applied to the load 11.

Furthermore, the control unit 8 alternately controls the first switching element 4a and the second switching element 4b to be on at a frequency 3n times the frequency of the three-phase alternating current acquired from the detection result of the power-supply voltage-detection unit 9. More specifically, the control unit 8 alternately controls the first switching element 4a and the second switching element 4b to be on, in synchronization with a voltage cycle ($\frac{1}{3}$n) times the voltage cycle of the three-phase alternating current acquired from the detection result of the power-supply voltage-detection unit 9.

Accordingly, as described above, the distortion rate of the respective phase currents takes the minimum value without causing any imbalance among the respective phase currents, thereby enabling to improve the power factor and suppress the harmonic current.

As described above, the DC power-supply device according to the first embodiment has a configuration including a rectifier circuit that rectifies a three-phase alternating current, a reactor connected to an input side or an output side of the rectifier circuit, a first capacitor and a second capacitor serially connected between output terminals to a load, a charging unit that selectively charges one or both of the first capacitor and the second capacitor, a control unit that controls the charging unit, and a power-supply voltage-detection unit that detects the voltage of the three-phase alternating current, and converts the three-phase alternating current into a direct current and supplies the direct current to the load. In the configuration, when a period combining a charging period and a non-charging period of a pair of the first capacitor and the second capacitor is designated as one cycle, the charging unit is controlled so that a charging frequency being an inverse number of the one cycle becomes 3n times (n is a natural number) the frequency of the three-phase alternating current. Therefore, switching is performed in the same phase of respective phases of the three-phase alternating current, while being shifted by 120 degrees with respect to the power supply cycle. Accordingly, even when there is a simultaneous off-period of the first switching element and the second switching element, or when there is a simultaneous on-period of the first switching element and the second switching element, waveforms of the respective phase currents become similar to each other, and thus imbalance among the respective phase currents does not occur. In addition, the distortion rate of the respective phase currents takes the minimum value, thereby enabling to improve the power factor and suppress the harmonic current.

More specifically, the charging unit is configured by the first switching element that switches charging and non-charging of the first capacitor, the second switching element that switches charging and non-charging of the second capacitor, the first backflow prevention element that prevents backflow of the charged electric charge of the first capacitor to the first switching element, and the second backflow prevention element that prevents backflow of the charged electric charge of the second capacitor to the second switching element, and the first switching element and the second switching element are alternately controlled to be on at a frequency 3n times the frequency of the three-phase alternating current acquired from a detection result of the power-supply voltage-detection unit.

Furthermore, the DC power-supply device according to the first embodiment has a full-wave rectifier mode in which the first switching element and the second switching element are always in an off-controlled state, and a booster mode in which the first switching element and the second switching element are alternately controlled to be on. Further, an on-duty ratio of the first switching element and the second switching element in the booster mode is changed according to the detected voltage value of the three-phase alternating current acquired from the detection result of the power-supply voltage-detection unit. Accordingly, a voltage fluctuation portion of the three-phase alternating current can be absorbed, thereby enabling to stabilize the output voltage applied to the load.

In the first embodiment described above, a configuration example including the power-supply voltage-detection unit has been described. However, for example, if the type of the three-phase alternating current (voltage and frequency) applied to the DC power-supply device according to the first embodiment is set in advance, even if in a configuration in which the power-supply voltage-detection unit is omitted, improvement of the power factor and suppression of the harmonic current can be achieved, although fluctuations of the power-supply voltage cannot be absorbed.

Furthermore, for example, when the DC power-supply device according to the first embodiment is applied to a plurality of types of the three-phase alternating current, it suffices to set the switching frequency to be 3n times the least common multiple of the frequency of respective phases of the three-phase alternating current. For example, when the DC power-supply device is applied to 50 Hz and 60 Hz three-phase alternating currents, it can be managed by setting the switching frequency to be 3n times the least common multiple of 50 Hz and 60 Hz, which is 300 Hz.

Further, in the configuration including the power-supply voltage-detection unit, the switching frequency may be set 3m times (in the above example, 3m (m is a natural number) times of 300 Hz) the least common multiple of the frequency of a plurality of types of the three-phase alternating current in case of emergency, assuming a case where the frequency and the voltage cycle of the three-phase alternating current cannot be detected. By setting the switching frequency in this manner, for example, if the frequency and the voltage cycle of the three-phase alternating current cannot be detected due to a failure or the like of the power-supply voltage-detection unit, effects of improving the power factor and suppressing the harmonic current can be acquired.

As the switching frequency increases, the switching loss increases, and thus, needless to mention, it is preferable to decrease the switching frequency by decreasing the values of n and m as much as possible during normal operations. For example, when the DC power-supply device is applied to 50 Hz and 60 Hz three-phase alternating currents, it is desired that the switching frequency in case of emergency is set to be 900 Hz (m=1), and the switching frequency during normal operations is set to be equal to or lower than 900 Hz.

Second Embodiment

Because the configuration of a DC power-supply device according to a second embodiment is the same as that of the DC power-supply device according to the first embodiment, descriptions thereof will be omitted.

The first embodiment has described an example in which the first switching element $4a$ and the second switching element $4b$ are alternately controlled to be on, in synchronization with the voltage cycle ($\frac{1}{3}$n) times the voltage cycle of a three-phase alternating current acquired from a detection result of the power-supply voltage-detection unit 9. The second embodiment describes an example in which an on-timing of the first switching element $4a$ and the second switching element $4b$ is controlled with respect to voltage zero crossing of a three-phase alternating current acquired from the detection result of the power-supply voltage-detection unit 9.

Figure 8:
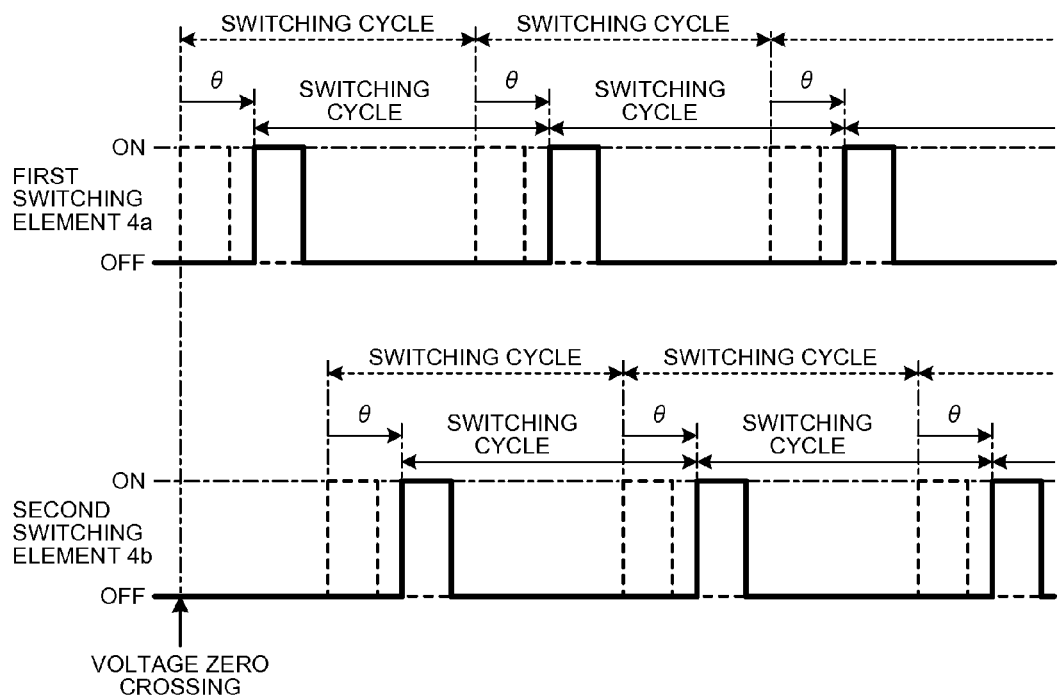
FIG. 8 is a diagram illustrating an example of a switching pattern of a DC power-supply device according to a second embodiment.

FIG. 8 is a diagram illustrating an example of a switching pattern of the DC power-supply device according to the second embodiment. In the example illustrated in FIG. 8, the switching pattern in the booster mode b illustrated in FIG. 3 of the first embodiment is illustrated.

As illustrated in FIG. 8, in the second embodiment, the control unit 8 shifts the on-timing of the first switching element $4a$ and the second switching element $4b$ by a phase angle θ, by using voltage zero crossing acquired from the detection result of the power-supply voltage-detection unit 9 as a reference. The voltage zero crossing as a reference may be any zero crossing of the respective phase voltages and the respective line voltages, so long as the voltage zero crossing is the reference of the on-timing of the first switching element $4a$ and the second switching element $4b$.

Figure 9:
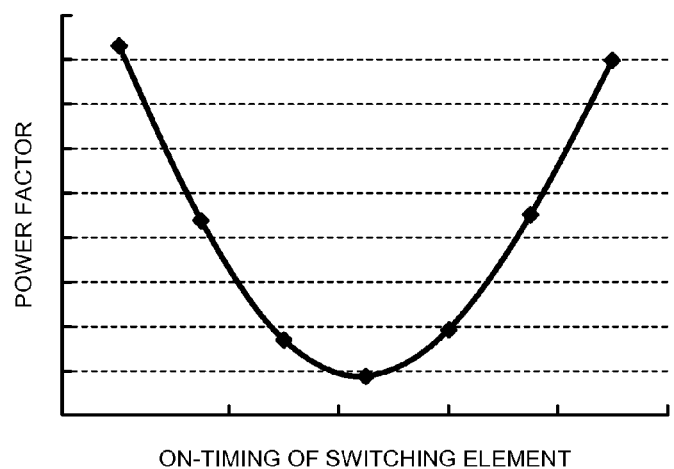
FIG. 9 is a diagram illustrating an example of a relation between a power factor and an on-timing of a switching element.

FIG. 9 is a diagram illustrating an example of a relation between a power factor and an on-timing of a switching element. In the example illustrated in FIG. 9, a vertical axis indicates a power factor, and a horizontal axis indicates an on-timing of a switching element.

As illustrated in FIG. 9, the power factor changes according to the on-timing of the first switching element $4a$ and the second switching element $4b$. The relation illustrated in FIG. 9 also changes according to the on-duty ratio of the first switching element $4a$ and the second switching element $4b$.

A current waveform of the three-phase alternating current also changes and the harmonic current also changes according to the on-timing and the on-duty ratio of the first switching element $4a$ and the second switching element $4b$.

Therefore, in the present embodiment, for example, the phase angle θ of the on-timing based on the zero crossing described above as a reference is held as a table, with respect to the on-duty ratio of the first switching element $4a$ and the second switching element 4b. When the first switching element 4a and the second switching element 4b are controlled to be on by applying the on-duty ratio of the first switching element 4a and the second switching element 4b described in the first embodiment, the phase angle θ read from the table is applied, thereby executing switching control by shifting the on-timing of the first switching element 4a and the second switching element 4b by the phase angle θ based on the voltage zero crossing acquired from the detection result of the power-supply voltage-detection unit 9 as a reference.

Due to this configuration, the switching control can be executed at an optimum timing according to the on-duty ratio of the first switching element 4a and the second switching element 4b, thereby enabling to enhance the effect of improvement of the power factor and the reduction effect of the harmonic current further.

As described above, according to the DC power-supply device of the second embodiment, the on-timing of the first switching element and the second switching element is shifted by the phase angle θ based on the voltage zero crossing acquired from a detection result of the power-supply voltage-detection unit as a reference, so that switching control can be executed at the optimum timing according to the on-duty ratio of the first switching element and the second switching element. Accordingly, the effect of improvement of the power factor and the reduction effect of the harmonic current can be further enhanced.

Third Embodiment

Figure 10:
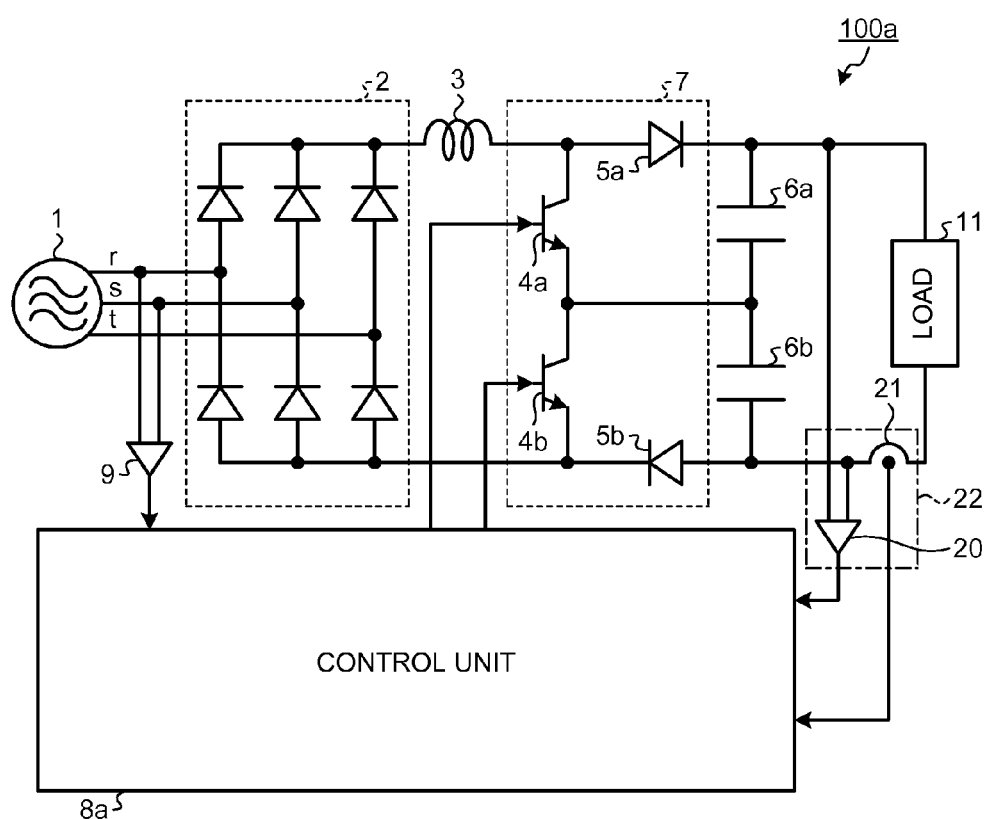
FIG. 10 is a diagram illustrating a configuration example of a DC power-supply device according to a third embodiment.

FIG. 10 is a diagram illustrating a configuration example of a DC power-supply device according to a third embodiment. Constituent elements identical or equivalent to those described in the first and second embodiments are denoted by like reference signs and detailed descriptions thereof will be omitted.

As illustrated in FIG. 10, a DC power-supply device 100a according to the third embodiment further includes an output-voltage detection unit 20 that detects an output voltage applied to the load 11, and an output-current detection unit 21 that detects an output current applied to the load 11 as a load-state detection unit 22 that detects the state of the load 11, in addition to the configuration illustrated in FIG. 1 in the first embodiment.

In the configuration illustrated in FIG. 10, a control unit 8a changes the on-duty ratio of the first switching element 4a and the second switching element 4b according to an output voltage value applied to the load 11, which is a detection result of the output-voltage detection unit 20.

For example, the control unit 8a holds a reference voltage value of the output voltage applied to the load 11 as a threshold, and executes control such that the DC power-supply device operates, for example, in the booster mode a (the double voltage mode) in which the on-duty ratio of the first switching element 4a and the second switching element 4b is 50% illustrated in FIG. 3, at the reference voltage value. If the detected voltage value is larger than the reference voltage value, the control unit 8a causes the DC power-supply device to operate in the booster mode b in which the on-duty ratio of the first switching element 4a and the second switching element 4b is smaller than 50%. If the detected voltage value is smaller than the reference voltage value, the control unit 8a causes the DC power-supply device to operate in the booster mode c in which the on-duty ratio of the first switching element 4a and the second switching element 4b is larger than 50%.

Alternatively, for example, the control unit 8a may hold the on-duty ratio of the first switching element 4a and the second switching element 4b, at which the output voltage applied to the load 11 becomes constant, as a table and may apply the on-duty ratio of the first switching element 4a and the second switching element 4b according to the detected voltage value.

By executing such control, the output voltage applied to the load 11 can be stabilized by absorbing changes of the load 11, for example, fluctuations of the output voltage due to fluctuations of an output current of the DC power-supply device 100a, such that the number of rotations of a compressor motor changes, when the load 11 is an inverter load that drives the compressor motor or the like used in an air conditioner, a heat-pump water heater, a refrigerator, a freezer, and the like. Accordingly, an output decrease of the compressor motor due to a decrease of the output voltage can be suppressed.

Furthermore, in the present embodiment, because the output-current detection unit 21 is provided as the load-state detection unit 22, the control unit 8a can calculate consumed power of the load 11 based on the output voltage value applied to the load 11 as a detection result of the output-voltage detection unit 20, and an output current value applied to the load 11 as a detection result of the output-current detection unit 21. The control unit 8a also can change the on-duty ratio of the first switching element 4a and the second switching element 4b according to the consumed power of the load 11.

In this case, for example, it suffices that the control unit 8a holds the on-duty ratio of the first switching element 4a and the second switching element 4b, at which the output voltage value applied to the load 11 becomes an optimum value, with respect to the consumed power of the load 11 as a table, and read the on-duty ratio of the first switching element 4a and the second switching element 4b according to the calculated power consumption of the load 11, thereby executing the switching control.

Figure 11:
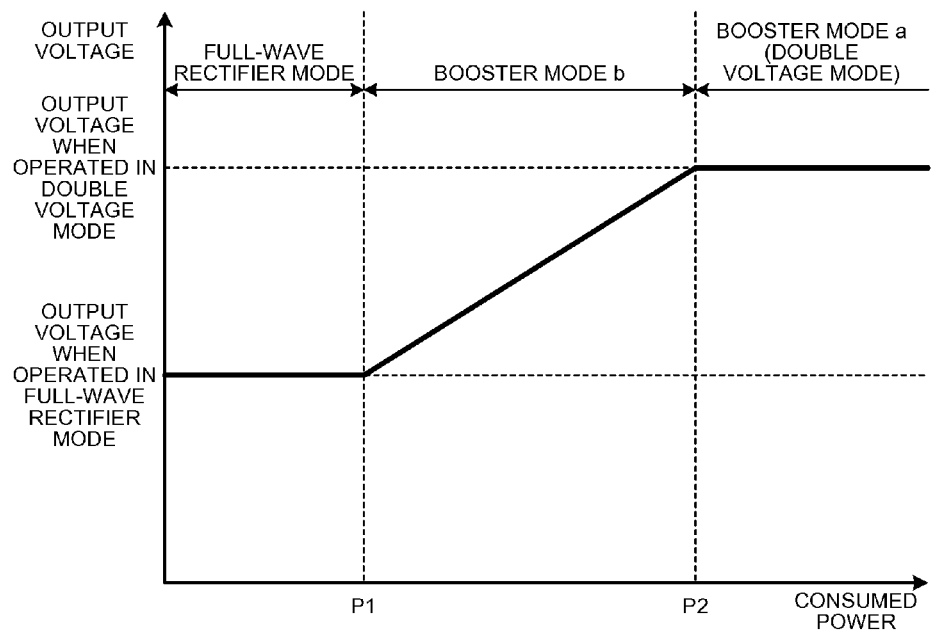
FIG. 11 is a diagram illustrating an operation example of the DC power-supply device according to the third embodiment.

FIG. 11 is a diagram illustrating an operation example of the DC power-supply device according to the third embodiment. In FIG. 11, a horizontal axis indicates consumed power of the load 11, and a vertical axis indicates an output voltage applied to the load 11.

In the example illustrated in FIG. 11, for example, if the consumed power of the load 11 is smaller than a predetermined value P1, the DC power-supply device is operated with the on-duty ratio of the first switching element 4a and the second switching element 4b being 0%, that is, in the full-wave rectifier mode.

If the consumed power of the load 11 is larger than a predetermined value P2 (P1<P2), the DC power-supply device is operated with the on-duty ratio of the first switching element 4a and the second switching element 4b being 50%, that is, in the booster mode a (the double voltage mode).

If the consumed power of the load 11 is equal to or larger than the predetermined value P1 and equal to or smaller than the predetermined value P2, the DC power-supply device is operated in the booster mode b, and the on-duty ratio of the first switching element 4a and the second switching element 4b is controlled according to the power consumption of the load 11. Specifically, in the example illustrated in FIG. 11, the on-duty ratio of the first switching element 4a and the second switching element 4b is changed in a range of 0% to 50%.

Figure 12:
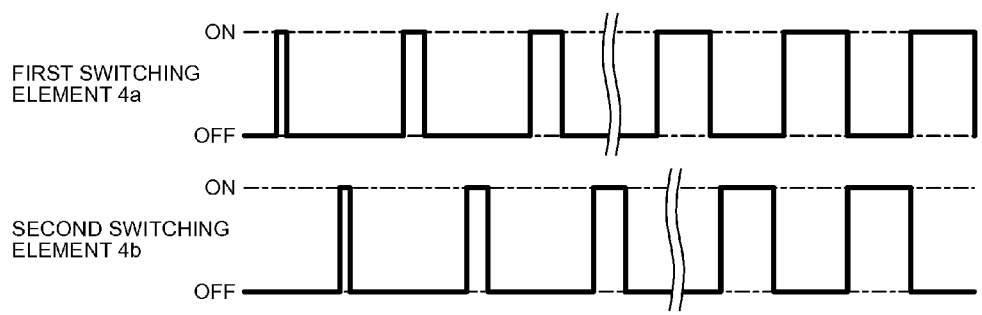
FIG. 12 is a diagram illustrating an example of a switching pattern in a process where power consumption of a load increases.

FIG. 12 is a diagram illustrating an example of a switching pattern in a process where power consumption of a load increases.

As illustrated in FIG. 12, in the process where the power consumption of the load increases from the predetermined value P1 to the predetermined value P2 illustrated in FIG. 11, the on-duty ratio of the first switching element 4a and the second switching element 4b is increased according to the power consumption of the load 11.

By executing control in this manner, an optimum output voltage value according to the power consumption of the load 11 can be acquired. For example, when the load 11 is an inverter load that drives the compressor motor or the like described above, an increase of the output current can be suppressed even if the power consumption increases with an increase of the number of rotations of the compressor motor.

Furthermore, in a region in which the consumed power of the load 11 is equal to or less than the predetermined value P2, a conduction loss of the first switching element 4a and the second switching element 4b can be decreased more than that in the case where the DC power-supply device is operated in the double voltage mode in the entire region, thereby enabling to achieve high efficiency.

In the example illustrated in FIG. 11, an example in which a region from the full-wave rectifier mode to the booster mode a (the double voltage mode) is designated as a variability region, and the variability region of the on-duty ratio of the first switching element 4a and the second switching element 4b is set to be 0% to 50% has been illustrated. However, the variability region of the output voltage can be a region up to the booster mode c, that is, a region exceeding the booster mode a (the double voltage mode). In this case of the booster mode c, the predetermined value P2 is further increased and the on-duty ratio of the first switching element 4a and the second switching element 4b is allowed, for example, up to 60% in the booster mode c, and the variability region of the on-duty ratio of the first switching element 4a and the second switching element 4b is set to be 0% to 60%. On the contrary, the variability region of the output voltage can be a region from the full-wave rectifier mode to a region before reaching the booster mode a (the double voltage mode). In this manner, the DC power-supply device having a large freedom degree of the variability range of the output voltage according to the power consumption and high general versatility can be acquired.

As described above, the DC power-supply device according to the third embodiment includes an output-voltage detection unit that detects an output voltage applied to a load, as a load-state detection unit that detects the state of the load. The on-duty ratio of the first switching element and the second switching element is changed according to the output voltage value applied to the load, as a detection result of the output-voltage detection unit. Accordingly, the output voltage applied to the load can be stabilized by absorbing changes of the load, for example, fluctuations of the output voltage due to fluctuations of the output current of the DC power-supply device, such that the number of rotations of a compressor motor changes, when the load is an inverter load that drives the compressor motor. Accordingly, an output decrease of the compressor motor with a decrease of the output voltage can be suppressed.

Furthermore, the DC power-supply device according to the third embodiment includes an output-current detection unit that detects the output current flowing to the load, as the load-state detection unit. The consumed power of the load is calculated based on the output voltage value applied to the load, as the detection result of the output-voltage detection unit, and the output current value to the load, as the detection result of the output-current detection unit, to change the on-duty ratio of the first switching element and the second switching element according to the consumed power of the load. Accordingly, an optimum output voltage value can be set according to the power consumption of the load. For example, when the load is the inverter load that drives the compressor motor, an increase of the output current can be suppressed, even if the power consumption increases with an increase of the number of rotations of the compressor motor.

In a region in which the consumed power of the load is low, the conduction loss of the first switching element and the second switching element can be decreased more than that in the case where the DC power-supply device is operated in the double voltage mode in the entire region, thereby enabling to achieve high efficiency.

The DC power-supply device having a large freedom degree of the variability range of the output voltage according to the power consumption and high general versatility can be acquired.

Fourth Embodiment

Figure 13:
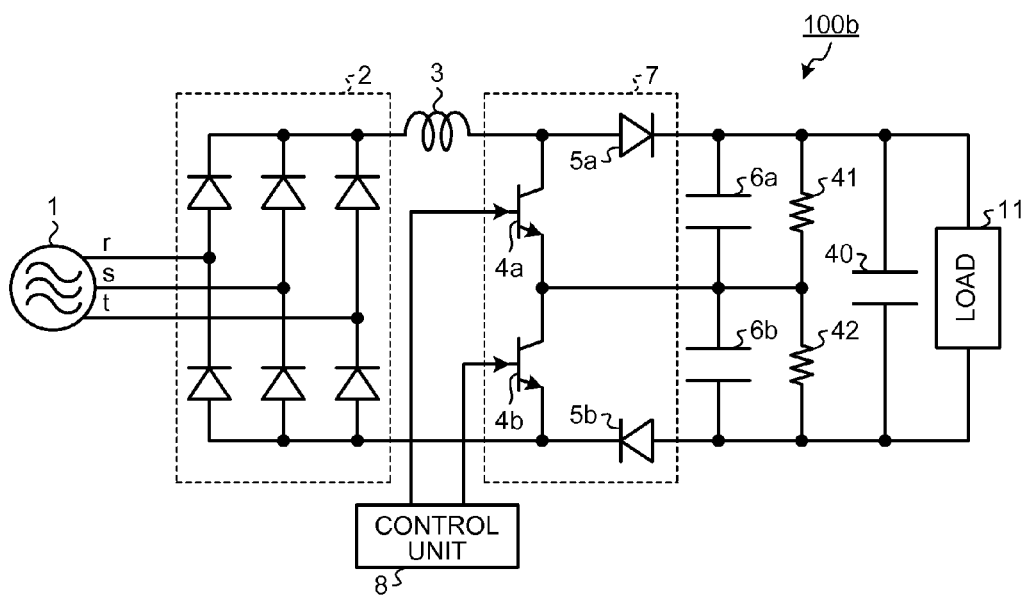
FIG. 13 is a diagram illustrating a configuration example of a DC power-supply device according to a fourth embodiment.

FIG. 13 is a diagram illustrating a configuration example of a DC power-supply device according to a fourth embodiment. Constituent elements identical or equivalent to those described in the first embodiment are denoted by like reference signs and detailed descriptions thereof will be omitted.

As illustrated in FIG. 13, a DC power-supply device 100b according to the fourth embodiment has a configuration including a smoothing capacitor 40 connected in parallel to a series circuit including the first capacitor 6a and the second capacitor 6b, and balancing resistors 41 and 42 respectively connected in parallel to the first capacitor 6a and the second capacitor 6b. In the example illustrated in FIG. 13, the power-supply voltage-detection unit 9 described in the first embodiment with reference to FIG. 1 is omitted.

As described in the third embodiment, it can be considered that imbalance occurs between voltages at both ends of the first capacitor 6a and the second capacitor 6b due to changes of the load 11, for example, changes of the consumed power with a change of the number of rotations of the compressor motor, when the load 11 is an inverter load that drives the compressor motor. In such a case, the output voltage applied to the load 11 becomes unstable, thereby making it difficult to drive the compressor motor stably by the inverter at a subsequent stage.

In the fourth embodiment, as described above, by connecting the smoothing capacitor 40 in parallel to the series circuit including the first capacitor 6a and the second capacitor 6b, and connecting the balancing resistors 41 and 42 respectively in parallel to the first capacitor 6a and the second capacitor 6b, the output voltage applied to the load 11 can be stabilized, thereby facilitating stable drive of the compressor motor by the inverter at a subsequent stage.

In the example illustrated in FIG. 13, a configuration example including both the smoothing capacitor 40 and the balancing resistors 41 and 42 is illustrated. However, it is also possible to stabilize the output voltage applied to the load 11 by including either the smoothing capacitor 40 or the balancing resistors 41 and 42. Therefore, needless to mention, the configuration including either the smoothing capacitor 40 or the balancing resistors 41 and 42 may be used.

As described above, according to the DC power-supply device of the fourth embodiment, a smoothing capacitor is connected in parallel to a series circuit including a first capacitor and a second capacitor, or balancing resistors are respectively connected in parallel to the first capacitor and the second capacitor. Accordingly, imbalance does not occur between voltages at both ends of the first capacitor and the second capacitor due to changes of the load, for example, changes of the consumed power with a change of the number of rotations of a compressor motor, when the load is an inverter load that drives the compressor motor. Accordingly, the output voltage applied to the load can be stabilized, thereby facilitating stable drive of the compressor motor by the inverter at a subsequent stage.

Fifth Embodiment

In the fifth embodiment, a refrigeration-cycle application device, to which the DC power-supply device according to the first to fourth embodiments is applied, is described.

Figure 14:
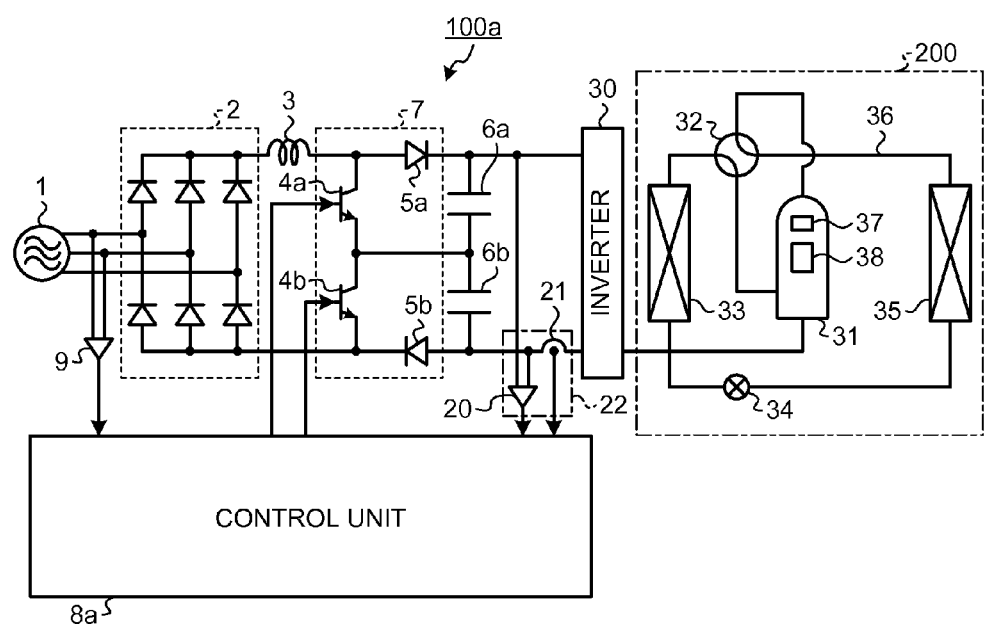
FIG. 14 is a diagram illustrating a configuration example of a refrigeration-cycle application device according to a fifth embodiment.

A specific configuration of the refrigeration-cycle application device according to the fifth embodiment is described here with reference to FIG. 14.

FIG. 14 is a diagram illustrating a configuration example of the refrigeration-cycle application device according to the fifth embodiment. In the example illustrated in FIG. 14, a configuration example in which an inverter 30 is connected thereto as a load of the DC power-supply device 100a described in the third embodiment with reference to FIG. 10 is illustrated.

As the refrigeration-cycle application device according to the fifth embodiment, for example, an air conditioner, a heat-pump water heater, a refrigerator, a freezer, or the like is assumed, which has a refrigeration cycle 200 as illustrated in FIG. 14.

The refrigeration cycle 200 is formed by sequentially connecting a compressor 31, a four-way valve 32, an internal heat exchanger 33, an expansion mechanism 34, and a heat exchanger 35 via a refrigerant pipe 36. Inside the compressor 31, a compression mechanism 37 that compresses a refrigerant and a compressor motor 38 that drives the compression mechanism 37 are provided.

The compressor motor 38 is a three-phase motor having three phase windings of U phase, V phase, and W phase, and is drive-controlled by the inverter 30 connected as the load of the DC power-supply device 100a.

The refrigeration-cycle application device configured as illustrated in FIG. 14 can enjoy the effects acquired by the DC power-supply devices described in the above first to fourth embodiments.

That is, in the booster mode, by alternately controlling the first switching element and the second switching element to be on at a frequency 3n times the frequency of the three-phase alternating current acquired from the detection result of the power-supply voltage-detection unit, the waveforms of the respective phase currents of the three-phase alternating current become similar to each other. Accordingly, imbalance among the respective phase currents does not occur, and thus the distortion rate of the respective phase currents takes the minimum value, thereby enabling to improve the power factor and suppress the harmonic current.

Furthermore, by changing the on-duty ratio of the first switching element and the second switching element according to the detected voltage value of the three-phase alternating current acquired from the detection result of the power-supply voltage-detection unit, a voltage fluctuation portion of the three-phase alternating current can be absorbed, thereby enabling to stabilize the output voltage applied to the load.

By executing switching control at the optimum timing according to the on-duty ratio of the first switching element and the second switching element, based on the voltage zero crossing acquired from the detection result of the power-supply voltage-detection unit as a reference, the effect of improvement of the power factor and the reduction effect of the harmonic current can be further increased.

By changing the on-duty ratio of the first switching element and the second switching element according to the output voltage value applied to the load, the output voltage applied to the load can be stabilized, thereby enabling to suppress an output decrease of a compressor motor with a decrease of the output voltage.

Furthermore, by changing the on-duty ratio of the first switching element and the second switching element according to the consumed power of the load, an optimum output voltage value according to the power consumption of the load can be acquired. Accordingly, an increase of the output current can be suppressed, even if the power consumption increases with an increase of the number of rotations of the compressor motor.

Further, in a region in which the consumed power of the load is small, the conduction loss of the first switching element and the second switching element can be decreased more than that in the case where the DC power-supply device is operated in the double voltage mode in the entire region, thereby enabling to achieve high efficiency.

Further, the freedom degree of the variability range of the output voltage according to the power consumption is large, and general versatility as the refrigeration-cycle application device can be increased.

As described above, according to the refrigeration-cycle application device of the fifth embodiment, by configuring the refrigeration-cycle application device by using the DC power-supply device according to the first to fourth embodiments described above, the effects that can be acquired by the DC power-supply device according to the first to fourth embodiments can be enjoyed.

In the embodiments described above, it is a mainstream to use an Si semiconductor made of silicon (Si) as the switching element and the backflow prevention element constituting the charging unit of the capacitor. However, a wide-bandgap (WBG) semiconductor made of silicon carbide (SiC), gallium nitride (GaN), or diamond may also be used.

The switching element and the backflow prevention element formed of a WBG semiconductor have high voltage endurance and high allowable current density. Therefore, downsizing of the switching element and the backflow prevention element is possible, and by using such downsized switching element and backflow prevention element, downsizing of a DC power-supply device configured by using these elements can be realized.

The switching element and the backflow prevention element formed of a WBG semiconductor have high heat resistance. Therefore, downsizing of heat radiating fins of a heatsink and air cooling of a water-cooled unit are possible, thereby enabling further downsizing of the DC power-supply device.

Furthermore, the switching element and the backflow prevention element formed of a WBG semiconductor have a low power loss. Therefore, the switching element and the backflow prevention element can have high efficiency, and thus the DC power-supply device can have high efficiency as well.

While it is preferable that both the switching element and the backflow prevention element are formed of a WBG semiconductor, it is also possible that only one of these elements is formed of a WBG semiconductor, and even in this case, the effects described above can be achieved.

In the embodiments described above, as the switching element, for example, a power transistor, a power MOSFET, and an IGBT have been mentioned as an example. However, identical effects can be acquired by using a MOSFET (Metal-Oxide-Semiconductor Field-Effect Transistor) having a super junction structure, known as a highly efficient switching element, an insulated gate semiconductor device, a bipolar transistor, or the like.

Furthermore, while the control unit can be configured by a CPU (Central Processing Unit), a DSP (Digital Signal Processor), or a discrete system of a microcomputer, other than those units, the control unit can be also configured by an electrical circuit element such as an analog circuit or a digital circuit.

The configurations described in the above embodiments are only examples of the contents of the present invention. These embodiments can be combined with other well-known techniques, and it is needless to mention that the present invention can be configured while modifying it without departing from the scope of the invention, such as omitting a part of constituent elements in these embodiments.

INDUSTRIAL APPLICABILITY

As described above, the present invention is useful as a technique of suppressing an increase of a harmonic current and deterioration of a power factor in a DC power-supply device, and is particularly suitable as a DC power-supply device having a configuration in which a three-phase alternating current is converted into a direct current and supplied to a load and a refrigeration-cycle application device including the DC power-supply device.

The invention claimed is:

1. A DC power-supply device that converts a three-phase alternating current into a direct current and supplies the direct current to a load, the DC power-supply device having a reactor on a converting path comprising:
a first capacitor and a second capacitor serially connected between output terminals to the load;
a charging unit that selectively charges one or both of the first capacitor and the second capacitor; and
a control unit that controls the charging unit to selectively charge one or both of the first capacitor and the second capacitor at a charging frequency, wherein
the control unit controls the charging unit in such a manner that, when a period combining a charging period and a non-charging period of the first capacitor and the second capacitor is designated as one cycle, the charging frequency, which is an inverse number of the one cycle, becomes 3n times (n is a natural number) a frequency of the three-phase alternating current.

2. The DC power-supply device according to claim 1, wherein the control unit controls the charging unit so that the charging frequency becomes 3m times (m is a natural number) a least common multiple of respective frequencies of a plurality of types of the three-phase alternating current.

3. The DC power-supply device according to claim 1, wherein
the charging unit includes:
a first switching element that switches charging and non-charging of the first capacitor;
a second switching element that switches charging and non-charging of the second capacitor;
a first backflow prevention element that prevents backflow of a charged electric charge of the first capacitor to the first switching element; and
a second backflow prevention element that prevents backflow of a charged electric charge of the second capacitor to the second switching element.

4. The DC power-supply device according to claim 3, wherein
the control unit includes:
a full-wave rectifier mode in which the first element and the second switching element are always in an off-controlled state; and
a booster mode in which the first switching element and the second switching element are alternately controlled to be on at the charging frequency, and wherein
in the booster mode, an on-duty ratio of the first switching element and the second switching element is changed to control an output voltage.

5. The DC power-supply device according to claim 4, further comprising a power-supply voltage-detection unit that detects a voltage of the three-phase alternating current, wherein
the control unit controls, in the booster mode, the first switching element and the second switching element to be on, in synchronization with ($\frac{1}{3}$n) times a cycle of the voltage of the three-phase alternating current that is obtained based on an output of the power-supply voltage-detection unit.

6. The DC power-supply device according to claim 5, wherein the control unit changes the on-duty ratio of the first switching element and the second switching element based on the output of the power-supply voltage-detection unit.

7. The DC power-supply device according to claim 6, wherein when the voltage of the three-phase alternating current is equal to or higher than a threshold, the control unit sets the on-duty ratio to be less than 50%, to provide a simultaneous off-section of the first switching element and the second switching element.

8. The DC power-supply device according to claim 6, wherein when the voltage of the three-phase alternating current is lower than a threshold, the control unit sets the on-duty ratio to be equal to or higher than 50%, to provide a simultaneous on-section of the first switching element and the second switching element.

9. The DC power-supply device according to claim 5, wherein the control unit controls an on-timing of the first switching element and the second switching element based on the output of the power-supply voltage-detection unit.

10. The DC power-supply device according to claim 3, further comprising a load-state detection unit that detects a state of the load, wherein
the control unit changes the on-duty ratio of the first switching element and the second switching element based on an output of the load-state detection unit.

11. The DC power-supply device according to claim 10, wherein the load-state detection unit includes an output-voltage detection unit that detects an output voltage applied to the load.

12. The DC power-supply device according to claim 11, wherein when the output voltage applied to the load is equal to or higher than a threshold, the control unit sets the on-duty ratio to be less than 50%, to provide a simultaneous off-section of the first switching element and the second switching element.

13. The DC power-supply device according to claim 11, wherein when the output voltage applied to the load is lower than a threshold, the control unit sets the on-duty ratio to be equal to or higher than 50%, to provide a simultaneous on-section of the first switching element and the second switching element.

14. The DC power-supply device according to claim 11, wherein
the load-state detection unit also includes an output-current detection unit that detects an output current flowing to the load, and
the control unit changes the on-duty ratio of the first switching element and the second switching element based on consumed power of the load.

15. The DC power-supply device according to claim 3, wherein at least one of the first switching element, the second switching element, the first backflow prevention element, and the second backflow prevention element is formed of a wide-bandgap semiconductor.

16. The DC power-supply device according to claim 15, wherein the wide-bandgap semiconductor is made of silicon carbide, a gallium nitride material, or diamond.

17. The DC power-supply device according to claim 1, wherein a smoothing capacitor is connected in parallel to a series circuit including the first capacitor and the second capacitor.

18. The DC power-supply device according to claim 1, wherein a balancing resistor is respectively connected in parallel to the first capacitor and the second capacitor.

19. A refrigeration-cycle application device comprising the DC power-supply device according to claim 1.

20. The refrigeration-cycle application device according to claim 19, comprising, as the load, an inverter that drives a compressor motor.

* * * * *